UNITED STATES PATENT OFFICE.

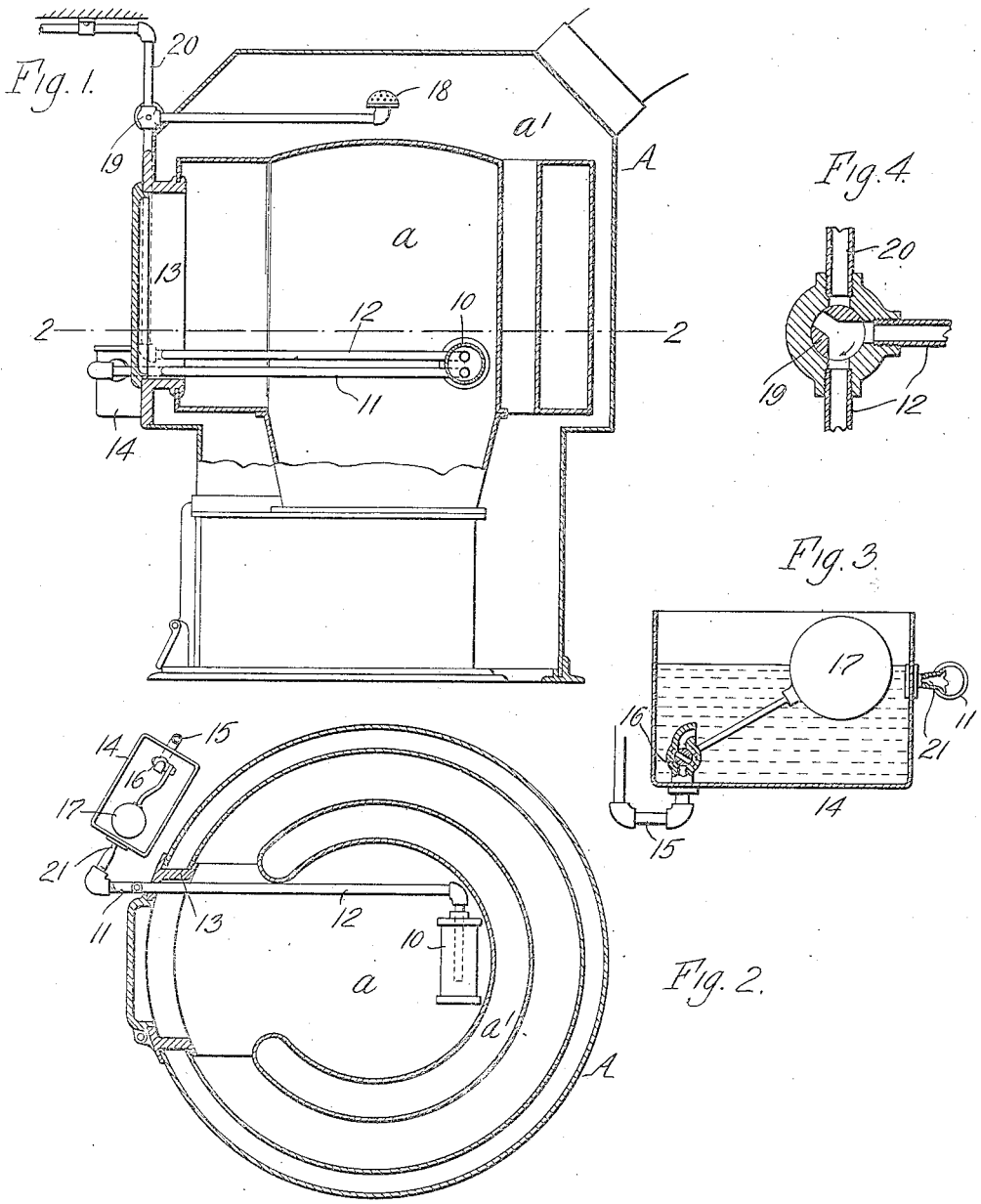

MILLARD S. TALLMAGE, OF BUFFALO, NEW YORK, ASSIGNOR OF ONE-HALF TO JOHN T. RONAN, OF BUFFALO, NEW YORK.

AIR-MOISTENING ATTACHMENT FOR HOT-AIR FURNACES.

1,240,388.      Specification of Letters Patent.      Patented Sept. 18, 1917.

Application filed July 8, 1916. Serial No. 108,113.

*To all whom it may concern:*

Be it known that I, MILLARD S. TALLMAGE, a citizen of the United States, residing at Buffalo, in the county of Erie and State of New York, have invented a new and useful Improvement in Air-Moistening Attachments for Hot-Air Furnaces, of which the following is a specification.

This invention relates to an air moistening attachment for hot air furnaces for the purpose of humidifying the hot air which is delivered from the furnace for heating the building.

The object of the invention is to produce a practical and efficient attachment of simple and inexpensive construction, which is adapted to be readily applied at small expense to furnaces and especially to furnaces already in use and which will effectually humidify the hot air from the furnaces so as to enable the hot air to be given the condition of humidity most suitable for use in the rooms of buildings heated by the furnaces.

In the accompanying drawings:—

Figure 1 is a sectional elevation of a hot air furnace provided with a humidifying attachment embodying the invention.

Fig. 2 is a sectional plan view thereof in line 2—2, Fig. 1.

Fig. 3 is a sectional elevation, enlarged of the water supply reservoir.

Fig. 4 is a section of the controlling valve.

A represents a hot air furnace, which may be of any usual or desired construction. *a* is the combustion chamber thereof and *a'* the hot air distributing chamber from which the hot air flues lead to the various rooms of the building heated by the furnace. The steam or vapor generated by the attachment is preferably discharged into the hot air distributing chamber *a'* from which the hot air flues lead so as to humidify the air delivered by the several flues, but in the claims the term hot air chamber is used to indicate any chamber or space in which the air heated by the furnace can be conveniently humidified.

10 represents a water heating chamber or steam or vapor generator which is located in the combustion chamber so as to be heated by the fire therein, and 11 and 12 represent respectively a water supply pipe leading to the generator 10 and a steam or vapor discharge pipe leading therefrom. The generator or water heater may be of any suitable construction, but preferably consists of a short section of large pipe with which the water supply and steam discharge pipes connect at one end and which is closed by a suitable cap or cover at the opposite end. The water pipe 11 extends through the outer wall or casing of the furnace, preferably passing through a hole in the frame 13 of the fuel door of the furnace. In many makes of furnaces the door frame is provided with one or more holes for the passage of water heating pipes and one of these holes is utilized for this purpose. The water pipe 11 connects, outside of the furnace, with a water tank or reservoir 14, which is supplied with water by a feed pipe 15, preferably connected with the water service pipe of the building. The feed of water to the tank or reservoir is automatically regulated so that the water is maintained in the generator or water heater 10 at a level below the top thereof, so as to always keep a steam space in the generator above the water. Preferably, the water feed pipe is provided inside of the water tank or reservoir with a feed valve 16 of any suitable construction actuated by a float 17 in the water tank or reservoir. The parts are so adjusted and proportioned that the float will maintain the water in the tank at a level such as to keep the water supply pipe 11 filled and always maintain a steam space above the water in the generator or water heater 10.

The steam discharge pipe 12 leads from the steam space of the generator or water heater 10 to the hot air chamber *a'* in the upper part of the furnace or other suitable hot air space where it is provided with a discharge head 18 or is perforated or otherwise formed so as to properly distribute the steam or vapor generated in the water heater into the air heated by the furnace. The pipe connections from the steam discharge pipe 12 to the discharge head 18 can either be located inside of the furnace casing or outside thereof as most convenient or desirable. If the connections are located outside of the furnace jacket or casing, as indicated in the drawings, the steam discharge pipe 12 preferably extends out of the furnace jacket through one of the water pipe holes in the frame 13 of the fuel door. The discharge head 18, however, is connected with the generator 10 by direct pipe connections independently of the water supply tank or regulating means.

19 represents a valve controlling the steam discharge pipe 12 and 20 represents a waste steam or drain pipe. The valve 19 shown is a three-way valve adapted in one position to connect the steam discharge pipe 12 with the discharge head located in the hot air chamber $a'$ and shut off the waste steam or drain pipe 20, and in another position to shut off the discharge head in the hot air chamber and connect the steam discharge pipe 12 with the waste steam or drain pipe 20. Thus by the proper adjustment of this valve the steam or vapor from the generator or water heater 10 can be discharged into the hot air chamber $a'$ for humidifying the hot air, and the discharge regulated so as to impart more or less humidity to the air, as desired, and when it is desired not to humidify the air, the valve can be adjusted to shut off the discharge head in the hot air chamber and prevent the discharge of steam or vapor therefrom, and permit the same to pass to the waste steam or drain pipe through which the water of condensation can be drained off to the sewer or other suitable point.

By the construction described the steam or vapor is generated in the water heater 10, which is located in the combustion chamber, where it gets the full effect of the heat from the fire and the steam or vapor passes directly therefrom to the discharge head 18 independently of the water supply tank or regulating means, and the water supply tank or reservoir 14, which is located outside of the furnace, can be of small dimensions, it only being necessary for this tank to be large enough to contain the float valve and float and maintain the required level of the water in the generator or water heater. It is not necessary for the water in the supply tank or reservoir to be heated, and in fact the water connection from the tank or reservoir to the generator is preferably restricted, as indicated at 21, so as to prevent as far as possible any circulation of hot water from the heater to the reservoir. In this way the heat is not wasted in heating the water in the reservoir and the heat in the furnace room is reduced, which is ordinarily desirable. Since the water tank or reservoir and the generator or water heater are connected only by the pipe 11, this connection and the pipe connection from the generator to the discharge head can be made through the pipe holes already provided in the door frame 13, and in the case of furnaces in which such provision is not made, it is only necessary to drill small pipe holes through the door frame or furnace jacket at the desired point and this can be done readily and at small expense by the ordinary plumber or steam fitter. It is not necessary for the furnace to be of special construction to suit the attachment or to cut a large opening in the wall of the combustion chamber to fit the generator or tank as in the constructions in which the tank or generator is fitted in the wall of the combustion chamber, and the attachment can be applied at much less expense. The water tank is supported by the water pipes 11 and 15 and it is not necessary to provide any additional support therefor.

I claim as my invention:—

1. The combination with a hot air furnace having a combustion chamber and a hot air chamber, of a water heating vessel located in the combustion chamber, water supply regulating means located outside of the furnace casing for automatically maintaining the water in said heating vessel at a level below the top thereof, a water pipe connecting said supply regulating means to said water heating vessel and passing through a hole in the furnace casing, means for discharging the steam or vapor from said water heating vessel into the hot air from the furnace, a pipe connecting the water heating vessel directly to said discharge means independently of the water supply means, a waste steam pipe, and a valve for connecting the water heating vessel either with said discharge means or with said waste steam pipe.

2. The combination with a hot air furnace having a combustion chamber and a hot air chamber, of a water heating vessel located in the combustion chamber, water supply regulating means located outside of the furnace casing for automatically maintaining the water in said heating vessel at a level below the top thereof, a water pipe connecting said supply regulating means to said water heating vessel and passing through a hole in the furnace casing, said pipe having a restriction for minimizing the circulation of hot water from said heating vessel to said water supply regulating means, and pipe connections leading directly from the upper portion of said water heating vessel to said hot air chamber independently of the supply regulating means for discharging the steam or vapor from said water heating vessel into the hot air for humidifying the same.

Witness my hand this 30th day of June, 1916.

MILLARD S. TALLMAGE.

Witnesses:
 CLARENDON W. GUY,
 GEORGE W. HINES.